(12) United States Patent
Takagi et al.

(10) Patent No.: US 10,093,098 B2
(45) Date of Patent: Oct. 9, 2018

(54) LIQUID DISCHARGING HEAD

(71) Applicant: CANON KABUSHIKI KAISHA, Tokyo (JP)

(72) Inventors: Yosuke Takagi, Yokohama (JP); Yuichiro Akama, Tokyo (JP); Satoshi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/496,469

(22) Filed: Apr. 25, 2017

(65) Prior Publication Data

US 2017/0313064 A1    Nov. 2, 2017

(30) Foreign Application Priority Data

Apr. 27, 2016   (JP) ................................. 2016-089395

(51) Int. Cl.
| | |
|---|---|
| *B41J 2/045* | (2006.01) |
| *B41J 2/175* | (2006.01) |
| *B41J 2/14* | (2006.01) |
| *H02H 9/04* | (2006.01) |

(52) U.S. Cl.
CPC ............ *B41J 2/1433* (2013.01); *H02H 9/045* (2013.01); *B41J 2002/14491* (2013.01)

(58) Field of Classification Search
CPC .. B41J 2/04511; B41J 2/1753; B41J 2/14137; B41J 2002/14443
See application file for complete search history.

(56) References Cited

U.S. PATENT DOCUMENTS

| | | | | |
|---|---|---|---|---|
| 6,074,041 | A * | 6/2000 | Imanaka | B41J 25/34 347/50 |
| 2013/0120504 | A1* | 5/2013 | Yanata | B41J 2/14233 347/68 |

FOREIGN PATENT DOCUMENTS

| | | |
|---|---|---|
| JP | 2006-15733 A | 1/2006 |
| JP | 2006015733 A * | 1/2006 |

* cited by examiner

*Primary Examiner* — Jason Uhlenhake
(74) *Attorney, Agent, or Firm* — Canon U.S.A., Inc. IP Division

(57) ABSTRACT

A liquid discharging head includes a print element substrate including an energy-generating element that generates energy used to discharge a liquid from a discharge port, and an electric wiring member including a plurality of contact pads arranged thereon. The plurality of contact pads are disposed in a contact area and include a first contact pad to which power for driving the energy-generating element is supplied and a second contact pad that has an electrostatic capacity lower than an electrostatic capacity of the first contact pad and that is disposed on an outer circumferential side of the contact area. The electric wiring member is connected to a ground of the print element substrate and includes a guard pad extending linearly outside the second contact pad.

16 Claims, 3 Drawing Sheets

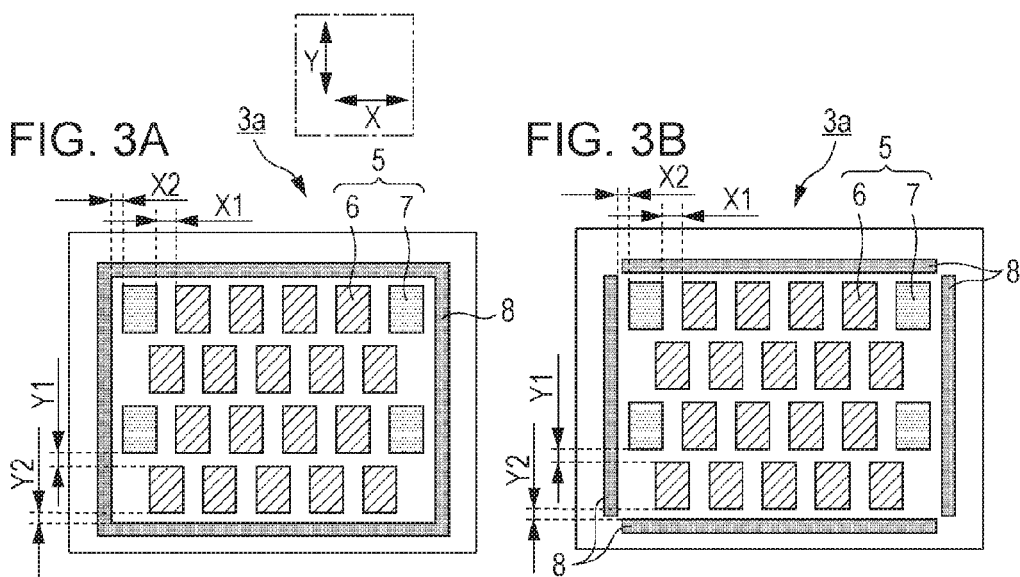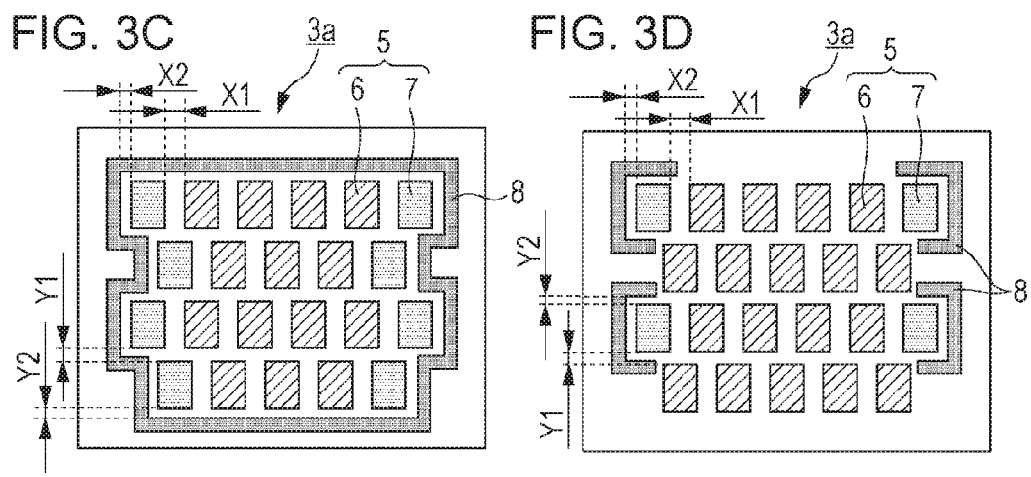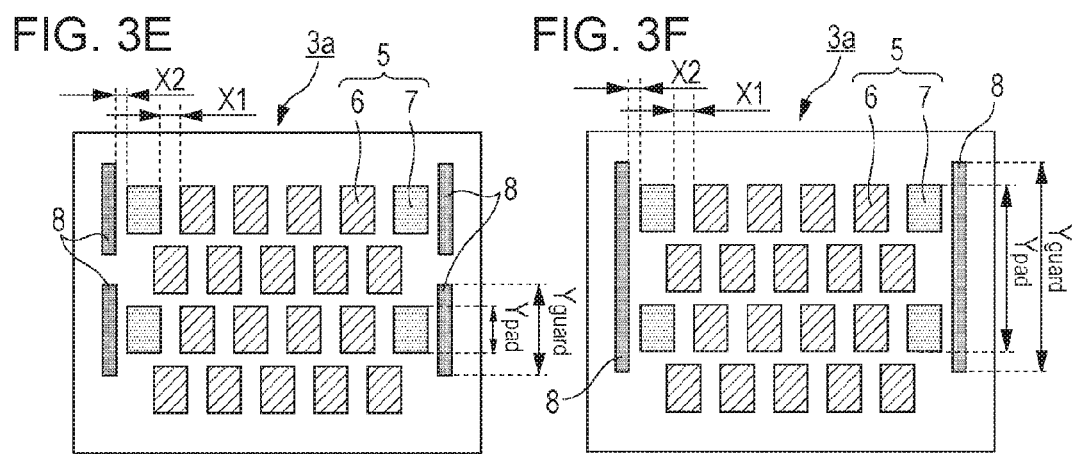

LIQUID DISCHARGING HEAD

BACKGROUND OF THE INVENTION

Field of the Invention

The present disclosure relates to a liquid discharging head that discharges a liquid such as an ink.

Description of the Related Art

A liquid discharging head, which is installed in the main body of a liquid discharge apparatus, includes an element substrate including an energy-generating element that generates energy used to discharge a liquid from a discharge port. Such a liquid discharging head typically drives the energy-generating element by using power and signals supplied from the main body of the liquid discharge apparatus. The liquid discharging head and the main body of the liquid discharge apparatus are electrically connected to each other in a manner in which contact pins disposed on the main body side of the liquid discharge apparatus make contact with contact pads disposed on the liquid discharging head.

The contact pads include a power contact pad (such as VH or GNDH) to which power for driving the energy-generating element is supplied and a signal contact pad (such as DATA or CLK) to which signals for driving the energy-generating element are supplied. These contact pads have different electrostatic capacities. A contact pad having a low electrostatic capacity has a low electrostatic resistance and has a problem in that, when static electricity is created, an electrostatic breakdown is likely to occur, which causes the liquid discharging head to electrically break. For example, in some cases where the liquid discharging head is installed in the main body of the liquid discharge apparatus, static electricity is created when a user's hand touches the liquid discharging head, and there is a possibility that an electrostatic breakdown occurs when the created static electricity is delivered to a portion having a low electrostatic resistance.

In view of this problem, Japanese Patent Laid-Open No. 2006-15733 discloses a liquid discharging head in which a contact pad having a low electrostatic capacity is adjacent to a contact pad having a large electrostatic capacity. With this structure, static electricity is delivered to the contact pad having a large electrostatic capacity even when the static electricity is created near the contact pad having a low electrostatic capacity. Thus, the electrostatic breakdown of the liquid discharging head can be suppressed.

However, the liquid discharging head disclosed in Japanese Patent Laid-Open No. 2006-15733 has a possibility of an electrostatic breakdown when static electricity is created at a contact pad having a low electrostatic capacity on the outer circumferential portion of a contact area in which contact pads are arranged. A contact pad having a low electrostatic capacity is preferably surrounded from four directions by a contact pad having a large electrostatic capacity in order to inhibit electrostatic breakdown from occurring. In this case, however, the degree of freedom of the arrangement of contact pads decreases. In addition, in some cases, a contact pad that is preferably disposed on the outer circumferential side of the contact area cannot be disposed on the outer circumferential side.

An inspection contact pad that receives signals for inspection is taken as an example of the contact pad that is preferably disposed on the outer circumferential side of the contact area. The inspection contact pad does not need to be electrically connected to the main body of the liquid discharge apparatus. In the case where contact pads that need to be electrically connected to the main body of the liquid discharge apparatus are arranged so as to gather, an area of the main body of the liquid discharge apparatus in which the contact pins are disposed can be decreased. Accordingly, the inspection contact pad is preferably disposed on the outer circumferential side of the contact area. In the case where the inspection contact pad has a low electrostatic capacity, there is a possibility that an electrostatic breakdown occurs when static electricity is created at the outer circumferential portion of the contact area.

SUMMARY OF THE INVENTION

The present disclosure provides a liquid discharging head that inhibits electrostatic breakdown from occurring even when static electricity is created at the outer circumferential portion of the contact area while maintaining the degree of freedom of the arrangement of the contact pads.

A liquid discharging head according to an aspect of the present disclosure includes a print element substrate including an energy-generating element that generates energy used to discharge a liquid from a discharge port, and an electric wiring member including a plurality of contact pads arranged thereon. The plurality of contact pads are disposed in a contact area and include a first contact pad to which power for driving the energy-generating element is supplied and a second contact pad that has an electrostatic capacity lower than an electrostatic capacity of the first contact pad and that is disposed on an outer circumferential side of the contact area. The electric wiring member is connected to a ground of the print element substrate and includes a guard pad extending linearly outside the second contact pad.

Further features of the present disclosure will become apparent from the following description of exemplary embodiments with reference to the attached drawings.

BRIEF DESCRIPTION OF THE DRAWINGS

FIGS. 3A to 3F each illustrate an example of the arrangement of guard pads.

DESCRIPTION OF THE EMBODIMENTS

An embodiment of the present disclosure will hereinafter be described with reference to the drawings. In the description and the drawings, like symbols designate components having like functions, and a duplicated description is omitted.

Structure of Liquid Discharging Head

Figure 1A:
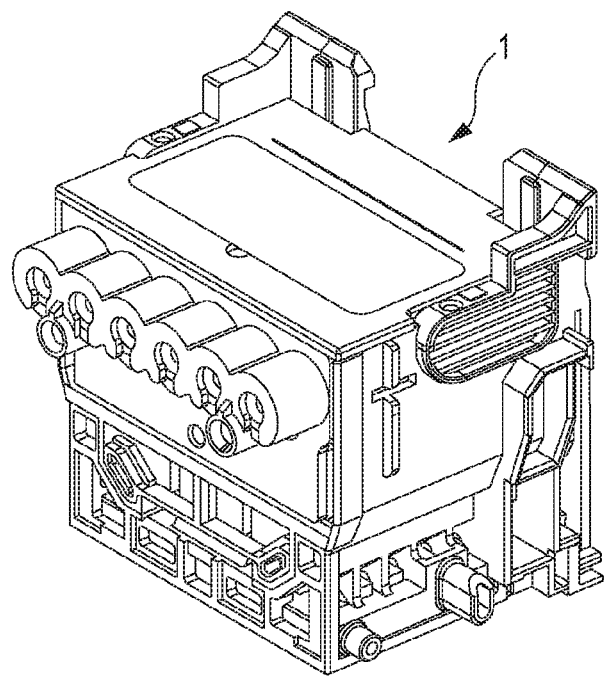
FIGS. 1A and 1B are perspective views of a liquid discharging head.
Figure 1B:
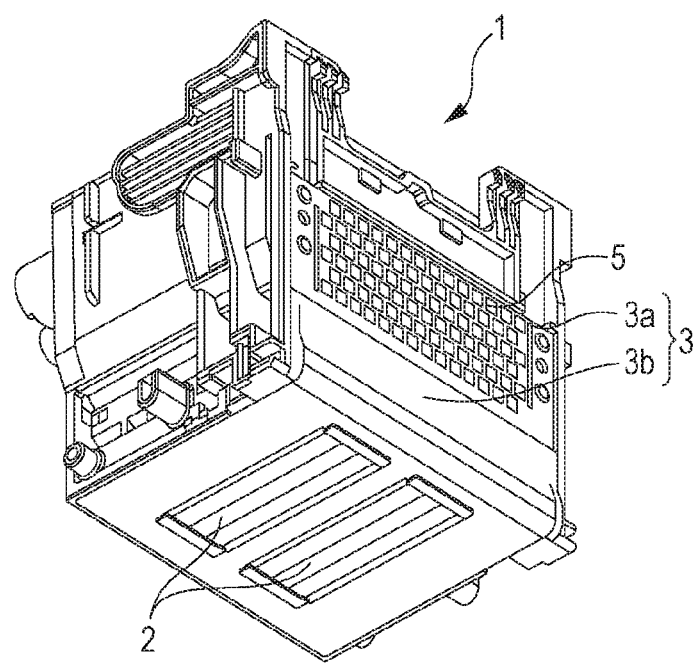

FIGS. 1A and 1B are perspective views of a liquid discharging head 1 to which the present disclosure is applied. The liquid discharging head 1 is detachably held by a carriage disposed on the main body of a liquid discharge apparatus not illustrated. The liquid discharging head 1 includes a print element substrate 2 and an electric wiring member 3.

The print element substrate 2 includes energy-generating elements (not illustrated) that generate energy used to discharge a liquid such as an ink from a discharge port (not illustrated). The energy-generating elements may be various elements proposed in liquid discharging techniques and are, for example, elements that convert electrical energy into thermal energy or mechanical energy. Wiring for supplying power to the energy-generating elements and various circuits may be formed on the print element substrate 2. A protective film is formed so as to cover the wiring and circuits.

The electric wiring member 3 includes an electric wiring board 3a and an electric connection portion 3b and electrically connects the print element substrate 2 to the main body of the liquid discharge apparatus, in which the liquid discharging head 1 can be installed. Contact pads 5 are arranged on the electric wiring board 3a, which is formed of a rigid plate. The main body of the liquid discharge apparatus includes an electric connection member to be electrically connected to the liquid discharging head 1. The electric connection member is connected to the contact pads 5, and the main body of the liquid discharge apparatus and the liquid discharging head 1 are electrically connected to each other. The electric connection portion 3b is formed of a flexible film and electrically connects the electric wiring board 3a and the print element substrate 2 to each other. The electric wiring member 3 receives power and signals for driving the energy-generating elements from the main body of the liquid discharge apparatus and supplies the received power and signals to the print element substrate 2.

Schematic Structure of Electric Wiring Member

Figure 2A:
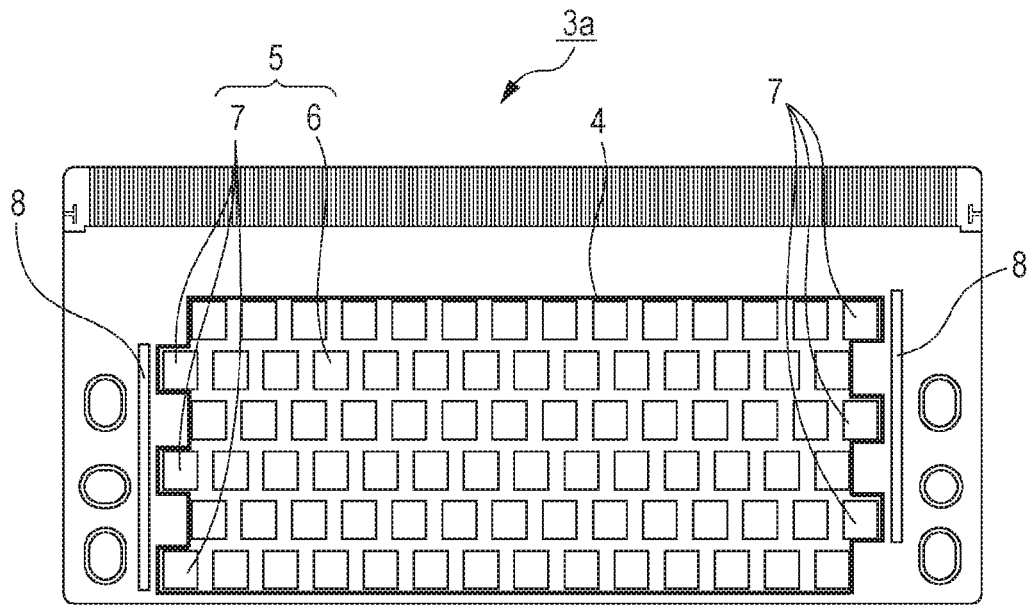
FIGS. 2A and 2B are diagrams of an electric wiring board.
Figure 2B:
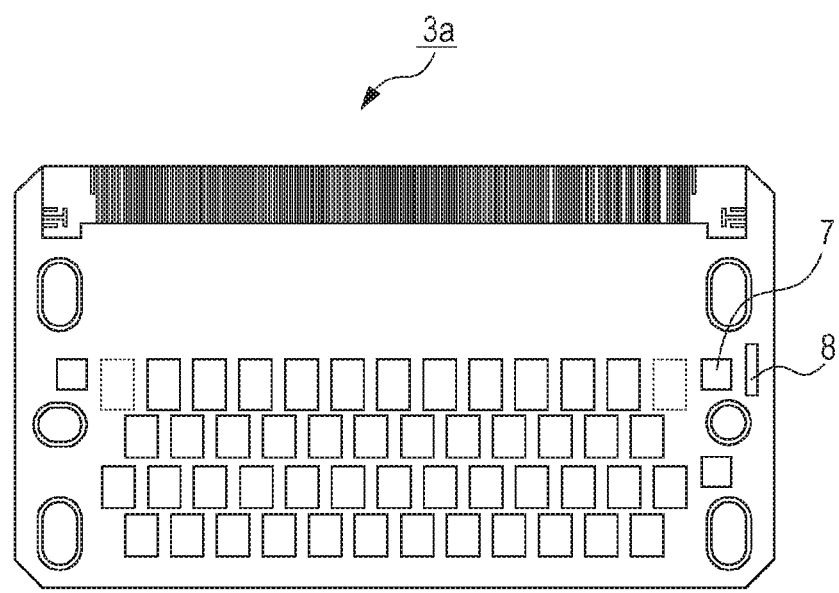

FIGS. 2A and 2B are diagrams of the electric wiring board 3a of the electric wiring member 3. As illustrated in FIG. 2A, the contact pads 5 are arranged on the electric wiring board 3a in rows having a staggered pattern. The contact pads 5 include a contact pad (referred to below as a first contact pad) to which power (VH or GNDH) for driving the energy-generating elements is supplied. The contact pads 5 also include a contact pad to which signals (DATA or CLK) for driving the energy-generating elements are supplied. During manufacturing processes before shipment, the operation of the energy-generating elements is inspected for electrical failures in the liquid discharging head 1. The contact pads 5 may include an inspection contact pad to which signals for inspection are supplied. The minimum area containing all of the contact pads 5 is referred to below as a contact area 4. Among the contact pads 5 in the contact area, contact pads that have an electrostatic capacity lower than the electrostatic capacity of the first contact pad and that are disposed on the outer circumferential side are referred to as second contact pads 7, which are distinguished from the other contact pads 6. In the description, the second contact pads 7 and the other contact pads 6 are collectively referred to as the contact pads 5 in the case where it is not necessary to distinguish between the second contact pads 7 and the other contact pads 6.

The inspection contact pad that receives signals for inspection is taken as an example of a contact pad that is preferably disposed on the outer circumferential portion of the contact area 4. It is not necessary for the inspection contact pad to be electrically connected to the main body of the liquid discharge apparatus. An area of the main body of the liquid discharge apparatus in which contact pins are disposed can be decreased in a manner in which contact pads that need to be electrically connected to the main body of the liquid discharge apparatus are arranged so as to gather. For this reason, the inspection contact pad is preferably disposed on the outer circumferential portion of the contact area 4. In some cases, however, the inspection contact pad is electrically connected to the protective film formed on a surface of the print element substrate 2 illustrated in FIG. 1B. The protective film typically has a low electrostatic capacity and a low electrostatic resistance. Accordingly, the inspection contact pad is preferably protected from static electricity such that static electricity is not delivered to the inspection contact pad.

The electric wiring board 3a includes at least one guard pad 8 for protecting the second contact pads 7 from static electricity. The guard pad 8 is connected to the ground of the print element substrate 2 illustrated in FIG. 1B but is not electrically connected to the main body of the liquid discharge apparatus. The guard pad 8 has a large electrostatic capacity and a high electrostatic resistance. Accordingly, in the case where static electricity is delivered to the guard pad 8, an electrostatic breakdown is much less likely to occur. For this reason, the at least one guard pad 8 is disposed on the electric wiring board 3a so as to extend linearly outside the corresponding second contact pad 7 in order to suppress delivery of static electricity to the second contact pad 7. In FIG. 2A, the second contact pads 7, which have a low electrostatic capacity, correspond to six contact pads 5 located at protruding portions of the contact area 4 among the contact pads 5 disposed on the outer circumferential portion of the contact area 4. A contact pad having a large electrostatic capacity does not correspond to the second contact pad 7, even in the case where the contact pad is disposed so as to protrude as illustrated in FIG. 2B, where three contact pads are formed so as to protrude, but one of the contact pads corresponds to the second contact pad 7. In this case, a single guard pad 8 may be disposed outside the contact pad corresponding to the second contact pad 7.

Example of Guard Pad Arrangement

FIGS. 3A to 3F each illustrate an example of the arrangement of the at least one guard pad 8.

FIG. 3A illustrates a first example in which the guard pad 8 is arranged. In this example, the guard pad 8 is disposed so as to surround the contact area. The guard pad 8 is formed in a rectangular frame shape in the example in FIG. 3A. Static electricity is created in the electric wiring board 3a mainly when the liquid discharging head 1 (see FIGS. 1A and 1B) including the electric wiring board 3a is detached from the main body of the liquid discharge apparatus. The liquid discharging head 1 is typically detached from the main body of the liquid discharge apparatus while being held in a user's hand. At this time, static electricity is created between the user's hand and a portion of the liquid discharging head that the user touches in some cases. As seen in FIGS. 1A and 1B, in the case where the liquid discharging head 1 is held in a user's hand, the outside of the contact area of the electric wiring board 3a is highly likely to be touched. In the first example of the arrangement, the guard pad 8 is disposed so as to surround the contact area. Accordingly, even when a user holds any portion outside the contact area, static electricity created can be delivered to the guard pad 8, and electrostatic breakdown can be inhibited from occurring. In addition, it is not necessary to dispose, inside the contact area, a contact pad having a low electrostatic capacity, and accordingly, the degree of freedom of the arrangement of the contact pads 5 can be increased. A distance X2 between the guard pad 8 and each second contact pad 7 in a first direction X in which the contact pads 5 are arranged is preferably less than a distance X1 between the adjoining contact pads 5. Similarly, a distance Y2 between the guard pad 8 and the second contact pad 7 in a second direction Y intersecting the first direction X (perpendicular to the first direction X in FIGS. 3A to 3F) is preferably less than a distance Y1 between the adjoining contact pads 5. With this structure, the guard pad 8 increases the area that can be protected from static electricity.

FIG. 3B illustrates a second example in which the guard pads 8 are arranged. In this example, the guard pads 8 are disposed separately from each other on the electric wiring board 3a. The guard pads 8 are disposed so as to surround the contact area. In the example in FIG. 3B, four guard pads 8 are disposed so as to define four sides of a rectangle that surrounds the contact area. A plurality of the guard pads 8 may thus be arranged. With this structure, the second contact pads 7 can be protected from static electricity.

FIG. 3C illustrates a third example in which the guard pad 8 is arranged. In this example, the guard pad 8 is disposed so as to follow the shape of the contact area and surround the contact area. As illustrated in this example, the shape of the guard pad 8 is not limited to a rectangular shape. In the case where the contact pads 5 are arranged in a staggered pattern and the second contact pads 7 have different distances from an edge of the electric wiring board 3a in the first direction X, the guard pad 8 is preferably disposed so as not to be linear but so as to follow the contact area. With this structure, a distance between the guard pad 8 and each second contact pad 7 can be decreased, and accordingly, each second contact pad 7 can be more effectively protected from static electricity.

FIG. 3D illustrates a fourth example in which the guard pads 8 are arranged. In the first to third examples of the arrangement, the at least one guard pad 8 surrounds the entire contact area. In the fourth example of the arrangement, the guard pads 8 surround part of the contact area. In some cases where the at least one guard pad 8 is disposed on the electric wiring board 3a, the size of the electric wiring board 3a increases by a size corresponding to an area in which the at least one guard pad 8 is disposed. In this example, an increase in the size of the electric wiring board 3a can be suppressed while the function to protect the second contact pads 7 from static electricity can be maintained. In the fourth example of the arrangement, the guard pads 8 are disposed so as to surround the respective second contact pads 7 from three directions. As seen in FIGS. 1A and 1B and FIGS. 3A to 3F, the electric wiring board 3a extends over the entire length of a side surface of the liquid discharging head 1 in the first direction X and extends over part of the length of the side surface of the liquid discharging head 1 in the second direction Y so as to be close to the center. For this reason, in the case where a user holds the liquid discharging head 1 in a user's hand, the user is highly likely to touch its edge in the first direction X. Accordingly, in the fourth example of the arrangement, the guard pads 8 are disposed on the outer circumferential portions in the first direction X, but no guard pads 8 are disposed on the outer circumferential portions in the second direction Y. With this structure, an increase in the size of the electric wiring board 3a can be suppressed while the function to protect the second contact pads 7 from static electricity can be maintained.

FIG. 3E illustrates a fifth example in which the guard pads 8 are arranged. In some cases, the size of the electric wiring board 3a increases due to the at least one guard pad 8 as described above. Accordingly, in some cases, the guard pads 8 are preferably disposed partially thereon. In the case where the guard pads 8 are disposed partially thereon, it is preferable that the guard pads 8 be disposed thereon so as to maintain the function to protect the second contact pads 7 from static electricity. For example, as illustrated in FIG. 3E, in the case where the contact pads 5 are arranged in a staggered pattern, the position of each row of the contact pads in the first direction X differs between both ends of the row in the first direction X. That is, no contact pads 5 are disposed on some areas adjacent to the second contact pads 7 in the second direction Y. In this case, static electricity is highly unlikely to be delivered from one of the second contact pads 7 to the contact pad 6 adjacent thereto in the second direction Y, and the static electricity is highly likely to be delivered to another second contact pad 7. Accordingly, the guard pads 8 are preferably disposed outside the second contact pads 7 on both edge sides in the first direction X. Comparatively, it is relatively easy for contact pads having a large electrostatic capacity to be arranged as the contact pads 6 adjacent to the second contact pads 7 in the first direction X. For this reason, each guard pad 8 may not be disposed so as to be along the sides of the corresponding second contact pad 7 that are parallel to the first direction X among two pairs of the sides of the second contact pad 7. Each guard pad 8 may be disposed so as to be along the sides in the second direction Y. In this case, the contact pads 6 adjacent to the second contact pads 7 in the first direction X preferably have a large electrostatic capacity. In the example illustrated in FIG. 3E, the guard pads 8 extend linearly in the second direction Y outside the corresponding second contact pads 7 in the first direction X. The length $Y_{guard}$ of each guard pad 8 in the second direction Y is greater than the width $Y_{pad}$ of the corresponding second contact pad 7. With this structure, the second contact pads 7 can be protected from static electricity. In addition, the guard pads 8 are not disposed so as to be along the sides parallel to the first direction X, and accordingly, an increase in the size of the electric wiring board 3a can be suppressed while electrical breakdown due to static electricity is inhibited from occurring.

FIG. 3F illustrates a sixth example in which the guard pads 8 are arranged. In the fifth example of the arrangement, the guard pads 8 correspond to the respective second contact pads 7. The present disclosure, however, is not limited thereto. In this example, rows of the contact pads 5 aligned in the first direction X are arranged in the second direction Y. Each guard pad 8 corresponds to some second contact pads 7 and extends linearly in the second direction Y over some rows of the contact pads 5. Also in this case, the length $Y_{guard}$ of each guard pad 8 in the second direction Y is greater than the width $Y_{pad}$ of an area in which the corresponding second contact pads 7 are disposed.

Modification

The present disclosure is described above with reference to the embodiments but is not limited to the embodiments. Various modifications that a person skilled in the art can understand can be made on the structure and detail of the present disclosure within the range of technical ideas of the present disclosure.

For example, among the contact pads 5, all of the contact pads 6 other than the second contact pads 7 may be power contact pads or antistatic contact pads having substantially the same electrostatic capacity as the power contact pads. In the case where the contact pads 6 include a contact pad having a low electrostatic capacity, the contact pad having a low electrostatic capacity is preferably disposed so as to be surrounded by an antistatic contact pad. In the case where the guard pads 8 are disposed so as to surround the contact area as in the case of the first to third examples of the arrangement, the contact pad having a low electrostatic capacity may be disposed on the outer circumferential portion parallel to the second direction Y. However, in the case where no guard pads 8 are disposed on the outer circumferential portion parallel to the second direction Y as in the case of the fourth to sixth examples of the arrangement, an antistatic contact pad is preferably disposed on the outer circumferential portion parallel to the second direction Y. In particular, the contact pads adjacent to the second contact pads 7 are preferably antistatic contact pads.

The guard pads 8 are preferably arranged in consideration for an area that is likely to be touched by a user's hand when the liquid discharging head 1 is detached or attached, for example, in consideration for the shape of the liquid discharging head 1.

In the above embodiments, the distance X1 between the adjoining contact pads 5 and the distance X2 between the guard pads 8 and the second contact pads 7 are described only in the case of the first example of the arrangement of the guard pads 8. However, the same is true in the case of the other examples of the arrangement. In the second to sixth examples of the arrangement, the distance X2 between the guard pads 8 and the second contact pads 7 in the first direction X, in which the contact pads 5 are arranged, is preferably less than the distance X1 between the adjoining contact pads 5 as in the case of the first example of the arrangement. In the second to fourth examples of the arrangement, the distance Y2 between the guard pads 8 and the second contact pads 7 in the second direction Y is preferably less than the distance Y1 between the adjoining contact pads 5 as in the case of the first example of the arrangement.

According to the present disclosure, electrostatic breakdown can be inhibited from occurring even when static electricity is created at the outer circumferential portion of the contact area while the degree of freedom of the arrangement of the contact pads is maintained.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-089395 filed Apr. 27, 2016, which is hereby incorporated by reference herein in its entirety.

What is claimed is:

1. A liquid discharging head, comprising:
a print element substrate including an energy-generating element that generates energy used to discharge a liquid from a discharge port; and
an electric wiring member including a plurality of contact pads arranged thereon,
wherein the plurality of contact pads are disposed in a contact area and include a first contact pad to which power for driving the energy-generating element is supplied and a second contact pad that has an electrostatic capacity lower than an electrostatic capacity of the first contact pad and that is disposed on an outer circumferential side of the contact area, and
wherein the electric wiring member is connected to a ground of the print element substrate and includes a guard pad extending linearly outside the second contact pad, and
wherein the plurality of contact pads are arranged in a first direction, the first direction intersects a second direction, and a distance between the second contact pad and the guard pad in at least one of the first direction and the second direction is less than a distance between the adjoining contact pads.

2. The liquid discharging head according to claim 1, wherein the guard pad is disposed so as to surround the contact area.

3. The liquid discharging head according to claim 1, wherein the guard pad is disposed so as to surround the second contact pad from three directions.

4. The liquid discharging head according to claim 1,
wherein the plurality of contact pads are arranged in a first direction,
wherein the guard pad extends linearly in a second direction intersecting the first direction, and
wherein a length of the guard pad in the second direction is longer than a length of the second contact pad in the second direction.

5. The liquid discharging head according to claim 1,
wherein the second contact pad is electrically connected to a protective film covering a circuit and a wiring of the print element substrate.

6. The liquid discharging head according to claim 5,
wherein the plurality of contact pads include a contact pad to be electrically connected to a main body of a liquid discharge apparatus in which the liquid discharging head is installed, and
wherein the guard pad is not electrically connected to the main body.

7. A liquid discharging head, comprising:
a print element substrate including an energy-generating element that generates energy used to discharge a liquid from a discharge port; and
an electric wiring member including a plurality of contact pads arranged thereon,
wherein the plurality of contact pads are disposed in a contact area and include a first contact pad to which power for driving the energy-generating element is supplied and a second contact pad that has an electrostatic capacity lower than an electrostatic capacity of the first contact pad and that is disposed on an outer circumferential side of the contact area,
wherein the electric wiring member is connected to a ground of the print element substrate and includes a guard pad extending linearly outside the second contact pad, and
wherein the second contact pad is an inspection contact pad for inspecting an operation of the energy-generating element.

8. The liquid discharging head according to claim 7, wherein the guard pad is disposed so as to surround the contact area.

9. The liquid discharging head according to claim 8, wherein the guard pad is formed in a rectangular frame shape surrounding the contact area.

10. The liquid discharging head according to claim 8,
wherein the electric wiring member includes a plurality of the guard pads, and
wherein the plurality of the guard pads define four sides of a rectangle surrounding the contact area.

11. The liquid discharging head according to claim 8,
wherein the plurality of contact pads are arranged in a staggered pattern, and
wherein the guard pad is disposed so as to follow the contact area.

12. The liquid discharging head according to claim 7, wherein the guard pad is disposed so as to surround the second contact pad from three directions.

13. The liquid discharging head according to claim 7,
wherein the plurality of contact pads are arranged in a first direction,
wherein the guard pad extends linearly in a second direction intersecting the first direction, and wherein a length of the guard pad in the second direction is longer than a length of the second contact pad in the second direction.

14. The liquid discharging head according to claim 13, wherein rows of the plurality of contact pads aligned in the first direction are arranged in the second direction,
wherein the guard pad extends linearly in the second direction over rows of the plurality of contact pads, and
wherein the length of the guard pad in the second direction is greater than a width of an area in which a plurality of the second contact pads are disposed.

15. The liquid discharging head according to claim 7, wherein the second contact pad is electrically connected to a protective film covering a circuit and a wiring of the print element substrate.

16. The liquid discharging head according to claim 15, wherein the plurality of contact pads include a contact pad to be electrically connected to a main body of a liquid discharge apparatus in which the liquid discharging head is installed, and
wherein the guard pad is not electrically connected to the main body.

* * * * *